Patented Nov. 14, 1939

2,180,260

UNITED STATES PATENT OFFICE 2,180,260

WATER SOLUBLE CONDENSATION PRODUCTS CONTAINING PHOSPHORUS AND THEIR MANUFACTURE

Josef Schäfer, Riehen, near Basel, Switzerland, assignor to the firm J. R. Geigy A. G., Basel, Switzerland No Drawing. Application March 19, 1937, Serial No. 131,961. In Germany March 21, 1936

9 Claims. (Cl. 260—456)

The present invention consists in a process for the manufacture of new water soluble condensation products containing phosphorus, which comprises condensing a mixture of a sulphonic acid of a monohydric phenolic body of the benzene series and an unsulphonated monohydric phenolic body of the same class with at least one of the group consisting of phosphorus halides and phosphorus oxyhalides at temperatures over 120° C. and neutralizing. Similar new and likewise valuable compounds can be obtained by performing the condensation in presence of a strong sulphonating agent.

The new compounds, probably high molecular condensation products of the ester type have valuable properties of different character depending on the reactants employed. They may be used for the manufacture of insecticidal or bactericidal compounds such as disinfectants, of textile assistants, of compounds for expelling or combatting pests, of tanning agents for example for the manufacture of leather which is proof against oidium or insects, and so on.

Schiff (Ann. 178, 173) discloses that dark condensation products with slight tanning properties are formed by heating phenol sulphonic acid with an excess of phosphorus oxychloride at 90° C. or by heating the acid alone to approximately 200° C. It follows from the fact that identical compounds are formed whether or not phosphorus oxychloride is present, that the phosphorus compound serves only as a binding agent for the water of the reaction and is not involved in the building up of the compound itself. On the basis of this scientific work, it subsequently became possible to produce tanning agents from phenol sulphonic acids by employing suitable reaction conditions, such as reduced pressure, appropriate temperatures, and suitable reaction periods. To facilitate the reaction, different assistants were proposed, such as phosphorus trichloride and oxychloride, thionyl chloride, etc. The heating under reduced pressure has to be continued for 24 to 72 hours. The condensation with phosphorus halides and oxyhalides, mostly an aftertreatment of the initial product made under reduced pressure, is for example performed at 80° C. or, according to later processes, using hydroxy-sulphonic acids of the naphthalene series, at 100–120° C. It was ascertained by experiments according to these known methods that condensation products practically free from phosphorus are obtained in all cases.

In contradistinction to the foregoing and according to the process of this invention by condensing at least one of the group consisting of phosphorus halides and phosphorus oxyhalides, and a hydroxyphenylsulphonic acid together with an unsulphonated aromatic hydroxy compound at temperatures over 120° C., new compounds are obtained which contain phosphorus in solid fixation. The phosphorus content may amount to as much as about 20%, calculated on $P_2O_5$, and according to the composition of the reaction mass and conditions. By boiling with water or acids and alkalies the new compounds are not noticeably attacked. The condensation products from phenol sulphonic acid alone according to the older and those with an unsulphonated aromatic hydroxy compound according to the new methods differ by their altogether different properties. The old products are syrupy liquids, the new ones resilient, slightly coloured resins which are soluble in water as such or after transformation into their alkali salts, and are not precipitable by weak acids.

The following examples illustrate the invention, the parts being by weight:

*Example 1*

280 parts of the dihydroxyditolylsulphone made from crude cresol according to the process of United States patent application Ser. No. 95,283, filed August 10, 1936, are heated after addition of 20 parts of chlorosulphonic acid with 150 parts of phosphorus oxychloride at temperatures from 140° to 180° C. for about 4 to 5 hours. After disappearance of the phosphorus compound there is obtained a crude product, which is insoluble in water but which, after being dissolved in caustic soda solution and precipitated with acids, becomes soluble in water which is weakly acid to congo. There is obtained after drying a light coloured powder with good tanning properties.

*Example 2*

100 parts of the sulphonic acid of crude cresol obtained by sulphonation of 50 parts of crude cresol with 50 parts of fuming sulphuric acid (15% $SO_3$) are freed from water in vacuo, 50 parts of amylphenol are aded and then 40 parts of phosphorus oxychloride drop by drop at 120–140° C. After the condensation is finished, neutralization is effected, the excess of phenol distilled off by means of steam and the whole evaporated to dryness. The product is useful in the production of tanning, disinfecting and insecticidal products.

By doubling the quantity of amylphenol and using 70 parts of phosphorus oxychloride there is obtained a condensation product with similar properties.

Example 3

100 parts of the sulphonic acid of crude cresol obtained by sulphonation of 50 parts of crude cresol with 50 parts of fuming sulphuric acid (15% SO₃) are freed from water by heating under reduced pressure (18 mm.) for about 3 hours to 125° C., mixed with 50 parts of 2:4-dichlorophenol and condensed with 40 parts of phosphorus oxychloride in the manner described above. After distillation by means of steam to remove the uncondensed dichlorophenol and after drying there is obtained a slightly coloured power capable of being employed in the production of tanning and insecticidal products.

By doubling the amount of dichlorophenol and using 90 parts of phosphorus oxychloride a product with similar properies is obtained.

Example 4

100 parts of crude cresol sulphonic acid made and dehydrated by sulphonation of 50 parts of crude cresol with 50 parts of fuming sulphuric acid (15% SO₃) and heating for about 3 hours in vacuo to 125° C. until all the water of the reaction has disappeared, are condensed with 100 parts of cresol and 110 parts of phosphorus oxychloride in presence of 20 parts of chlorosulphonic acid. After neutralization and distillation by means of steam the whole is evaporated to dryness to yield a final product with good tanning properties, which is capable of being used as intermediate product for higher condensed tanning agents.

By condensing the same quantity of cresol sulphonic acid with 75 parts of crude cresol and 80 parts of phosphorus oxychloride, a product with similar properties is obtained.

Example 5

100 parts of p-chlorophenol sulphonic acid are heated in vacuo until the greatest part of the water is expelled, then 80 parts of dichlorophenol and the same quantity of phosphorus oxychloride are added and the whole heated until disappearance of POCl₃. Finallly, the mass is neutralized and subjected to steam distillation to remove the excess of chlorophenol. The resulting product is distinctly poisonous.

Example 6

Into 400 parts of crude cresol sulphonic acid, there are dropped under reduced pressure 100 parts of cresol according to the process of the aforesaid United States patent application Ser. No. 95,283. To 280 parts of this mixture consisting of crude cresol sulphone and sulphonic acid there are slowly added at temperatures over 120° C. 70 parts of phosphorus oxychloride and treating is continued until disappearance of reflux. Finally there is obtained a product soluble in water and possessing good tanning properties and adapted for the production of tanning agents.

In the place of the phosphorus halides used in the above examples there may be used also phosphorus oxychloride, phosphorus bromides and so on.

What I claim is:

1. A process for the manufacture of water soluble condensation products containing phosphorus, which comprises condensing a mixture of 1 mol. of a sulphonic acid of a monohydric phenolic body of the benzene series and at least ½ mol. of an unsulphonated monohydric phenolic body of the same class with at least one of the group consisting of phosphorus halides and phosphorus oxyhalides at temperatures over 120° C. and neutralizing.

2. A process for the manufacture of water soluble condensation products containing phosphorus, which comprises condensing 1 mol. of a mixture of a sulphonic acid of a monohydric phenolic body of the benzene series and at least 0.5 mol. of an unsulphonated monohydric phenolic body of the same class in presence of a strong sulphonating agent with at least one of the group consisting of phosphorus halides and phosphorus oxyhalides at temperatures over 120° C. and neutralizing.

3. A process for the manufacture of water soluble condensation products containing phosphorus, which comprises condensing a mixture of 1 mol. of a sulphonic acid of a monohydric phenolic body of the benzene series and at least 0.5 mol. of an unsulphonated monohydric phenolic body of the same class with phosphorus oxychloride at temperatures over 120° C. and neutralizing.

4. A process for the manufacture of water soluble condensation products containing phosphorus, which comprises condensing a mixture of 1 mol. of a sulphonic acid of a monohydric phenolic body of the benzene series and at least 0.5 mol. of an unsulphonated monohydric phenolic body of the same class in presence of a strong sulphonating agent with phosphorus oxychloride at temperatures over 120° C. and neutralizing.

5. A process for the manufacture of water soluble condensation products containing phosphorus, which comprises condensing 1 mol. of the sulphonic acid of crude cresol and at least 0.5 mol. of a monohydric phenolic body of the benzene series with phosphorus oxy-chloride at temperatures over 120° C. and neutralizing.

6. A process for the manufacture of water soluble condensation products containing phosphorus, which comprises condensing 1 mol. of the sulphonic acid of crude cresol and 1 mol. of a dihydroxydiphenylsulphone with phosphorus oxychloride at temperatures over 120° C. and neutralizing.

7. A process for the manufacture of water soluble condensation products containing phosphorus, which comprises condensing 1 mol. of the sulphonic acid of crude cresol and 1 mol. of crude cresol with phosphorus oxychloride at temperatures over 120° C. and neutralizing.

8. A process for the manufacture of water soluble condensation products containing phosphorus, which comprises condensing 1 mol. of the sulphonic acid of crude cresol and one mol. of 2:4-dichlorophenol with phosphorus oxychloride at temperatures over 120° C. and neutralizing.

9. A water soluble condensation product containing phosphorus, comprising the neutralized product of reaction between 1 mol. of a sulphonic acid of a monohydric phenolic body of the benzene series, at least 0.5 mol. of an unsulphonated monohydric body of the same class and at least one of the group consisting of phosphorus halides and phosphorus oxyhalides at temperatures over 120° C., said product being soluble in water and alkalies and capable of being employed in the production of insecticidal, bactericidal compounds, textile assistants, compounds for expelling or combatting pests or tanning agents.

JOSEF SCHÄFER.